2,760,894
UNVULCANIZED ELASTOMERS CONTAINING SILICA

Ralph F. Wolf, Akron, Ohio, assignor to Columbia Southern Chemical Corporation, Allegheny County, Pa., a corporation of Delaware No Drawing. Application June 29, 1953, Serial No. 364,927

2 Claims. (Cl. 154—43.5)

This invention relates to unvulcanized elastomers and to articles containing the same.

Liquid hydrocarbons such as gasoline, toluene, etc., attack natural rubber and most types of synthetic rubbers, such as butyl rubber and GR–S for example. Vulcanized oil-susceptible elastomers swell in hydrocarbon solvents but retain their shape and do not dissolve. Unvulcanized oil-susceptible elastomers, on the other hand, rapidly swell and dissolve.

According to the present invention unvulcanized oil-susceptible elastomers loaded with finely divided hydrated silica have been found to resist the tendency to excessive swelling and dissolution in liquid hydrocarbons. A minimum of about five volumes of silica per 100 volumes of elastomer is generally necessary to prevent dissolution of the elastomer, although three volumes of silica reduces the rate of dissolution of most elastomers sufficiently to prevent appreciable damage to an elastomer which is not in prolonged contact with a hydrocarbon. Greater loadings of silica, up to 15 volumes or more (rarely more than 30 volumes) per 100 of rubber, are frequently advantageous, as swelling is appreciable at low loadings and diminishes as the loading is increased. Elastomers loaded with an effective amount of silica are plastic and tacky as is characteristic of unvulcanized elastomers, and swell but do not dissolve in the presence of hydrocarbon oils. Highly loaded rubber is substantially non-swellable and non-plastic, and is unsatisfactory for use in the present invention. No vulcanizing agents are present in elastomers according to the present invention, since their use in unvulcanized form is contemplated.

Silica used as the loading material is a finely divided, hydrated, precipitated product having an average ultimate particle size less than one micron and preferably less than 0.1 micron. This silica product comprises finely divided, precipitated, hydrated silica flocs which contain in excess of 90 per cent and preferably 94 per cent or more, of $SiO_2$ measured on anhydrous basis (that is, on a basis excluding free and bound water), bound water in the proportion of about 3 to 9 moles (normally about 6 moles) of $SiO_2$ per mole of bound water, and from 2 to 10 per cent of free water by weight of the pigment. The pigment has a surface area of about 25 to 200 square meters per gram, preferably 75 to 175 square meters per gram, and an average ultimate particle size below 0.1 micron, usually in the range of 0.015 to 0.05 micron. The pigment may be free of $Na_2O$, and preferably contains no more than 1.75 per cent and generally less than one per cent by weight of $Na_2O$. Surface area may be measured by the Brunauer-Emmett-Teller method, which is described in the Journal of the American Chemical Society, vol. 60, page 309 (1938).

The term "free water" is used to herein denote water driven off by heating the pigment to 105° C. for 24 hours. The term "bound water" refers to water which is driven off by heating the pigment to its ignition temperature, for example about 1000° to 1200° C., and which is not driven off as free water.

The silica herein contemplated may be prepared by a large number of methods. A particularly effective method of preparation involves reaction of finely divided alkaline earth metal silicate, such as calcium silicate, having an average ultimate particle size below 0.10 micron, with an acid having an anion which forms a water soluble salt with the alkaline earth metal. Hydrochloric acid is a typical example. In the practice of this process, the acid is reacted with the silicate in aqueous medium, and sufficient acid is added to extract calcium from the silicate, leaving silica containing not over 6 per cent by weight of CaO. The addition of acid causes a reduction in the pH of the slurry to a value between about 3 and 5. The slurry of calcium silicate may be agitated during addition of acid, and it is desirable to add acid in small portions until the desired pH is reached as shown by a suitable indicator, so as to avoid use of excess acid. After the reaction of calcium silicate with acid is complete and the pH of the aqueous slurry is below about 4 to 5, the precipitated silica is recovered.

Silica precipitated as above described has a surface area below 200 square meters per gram, and filters and settles slowly. Separation of silica from the aqueous medium is facilitated by adjustment of the pH of the slurry to about 5 to 9. Best pigment is obtained when the pH is adjusted to 5 to 7. The silica is recovered by settling and/or filtration, and is thereafter dried at a temperature of 100° to about 200° C.

While one method of precipitating silica has been described in detail, silica suitable for loading rubber according to the present invention may be prepared by numerous other methods. For example, another general method involves precipitation of silica by acidification of an aqueous solution of sodium silicate or water glass.

Elastomers according to the present invention may be used for a number of purposes, for example as sealants in self-sealing fuel tanks or as adhesives.

Natural rubber loaded with silica according to the present invention is particularly adapted for use in self-sealing fuel tanks. Such tanks are of multiple layer construction and contain a natural rubber layer which seals in the event of puncture so as to prevent escape of fuel. The innermost layer, with which fuel is normally in contact, is preferably made of a vulcanized oil resistant rubber, such as Buna N for example. A thin coating of flake nylon may be applied to the inner layer to separate it from the sealing layer. The nylon coating is advantageous in that it prevents fuel, which penetrates the inner layer to a slight extent, from normally contacting the sealing layer. Surrounding the sealing layer are one or more plies of coated fabric which lend rigidity to the tank structure.

In the event the tank is punctured, as for example by a bullet, gasoline comes into contact with the hole, causing the rubber adjacent the hole to swell sufficiently to close the same. Unvulcanized oil soluble elastomers not loaded with silica are unsuitable for use in self-sealing tanks because they continue to swell and eventually dissolve when contacted with a liquid hydrocarbon.

Prior to the present invention partially cured natural rubber has sometimes been used as the sealant in self-sealing tanks. It does not go into solution in the presence of hydrocarbons, but is less plastic than unvulcanized rubber and therefore less satisfactory as a sealant.

Both natural rubber and synthetic elastomers, which are capable of swelling in the presence of hydrocarbon oils, are suitable for use as adhesives, for example rubber cement. The cement may be prepared by any suitable method known in the art, which generally comprises swelling the elastomer with hydrocarbon solvent and working the mass in a mixer to form a viscous cement. Cements of high viscosity can be prepared with the silica filled elastomers of the present invention due to the resistance to swell of the elastomers in the solvent. Low loadings of silica are generally preferred for use in adhesives, as appreciable swelling of the elastomer is desirable.

While the present invention has been described with reference to specific embodiments and illustrations, it is understood that the scope of the invention is limited only by the appended claims.

I claim:

1. A multiple layer, self-sealing fuel tank having an intermediate sealing layer swellable in hydrocarbon oils but normally out of contact with such oils, said layer comprising unvulcanized natural rubber containing from about 5 to 30 volumes of finely divided, hydrated silica per 100 volumes of rubber, an inner layer of a flexible material resistant to hydrocarbon oils and an outer layer which lends rigidity to the tank.

2. A multiple layer, self-sealing fuel tank including an inner layer of a flexible material resistant to hydrocarbon oils, an outer layer which lends rigidity to the tank and an intermediate sealing layer, said sealing layer comprising unvulcanized natural rubber containing about 5 volumes of finely divided, hydrated silica per 100 volumes of rubber.

References Cited in the file of this patent

UNITED STATES PATENTS

| | | |
|---|---|---|
| 2,269,377 | Omansky | Jan. 6, 1942 |
| 2,388,656 | Lichty et al. | Nov. 6, 1945 |
| 2,440,965 | Merrill et al. | May 4, 1948 |
| 2,497,123 | Frolich | Feb. 14, 1950 |
| 2,597,872 | Iler | May 27, 1952 |
| 2,616,860 | Leukhardt et al. | Nov. 4, 1952 |